Aug. 5, 1947.  A. M. MASICH  2,425,158
ADJUSTABLE GUIDES FOR CONVEYER SYSTEMS
Filed Jan. 26, 1946  5 Sheets-Sheet 1

Anthony M. Masich,
Inventor.

By  Paul Eaton
Attorney

Aug. 5, 1947.  A. M. MASICH  2,425,158
ADJUSTABLE GUIDES FOR CONVEYER SYSTEMS
Filed Jan. 26, 1946  5 Sheets-Sheet 2
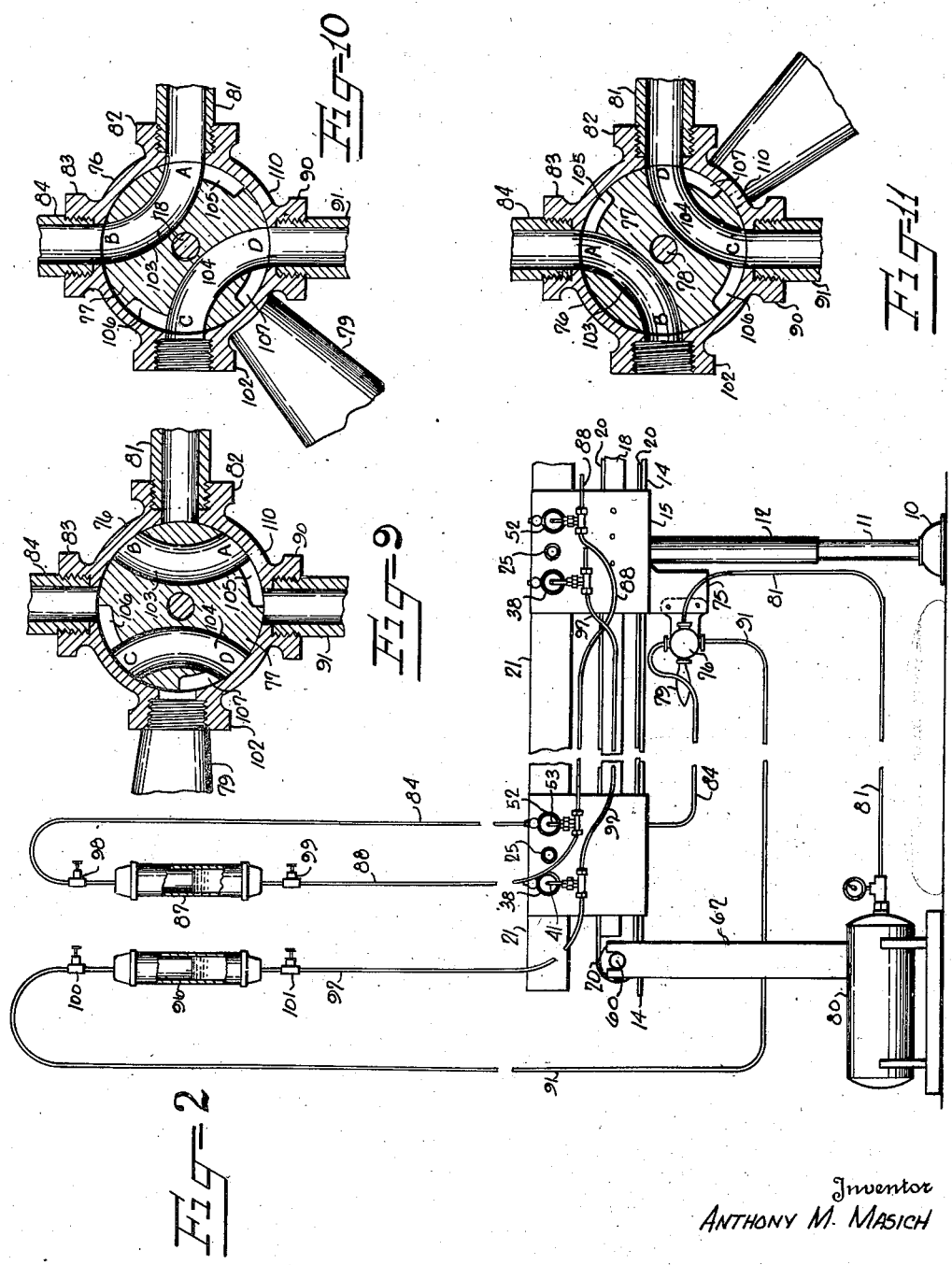
Inventor
ANTHONY M. MASICH
By Paul S. Eaton
Attorney

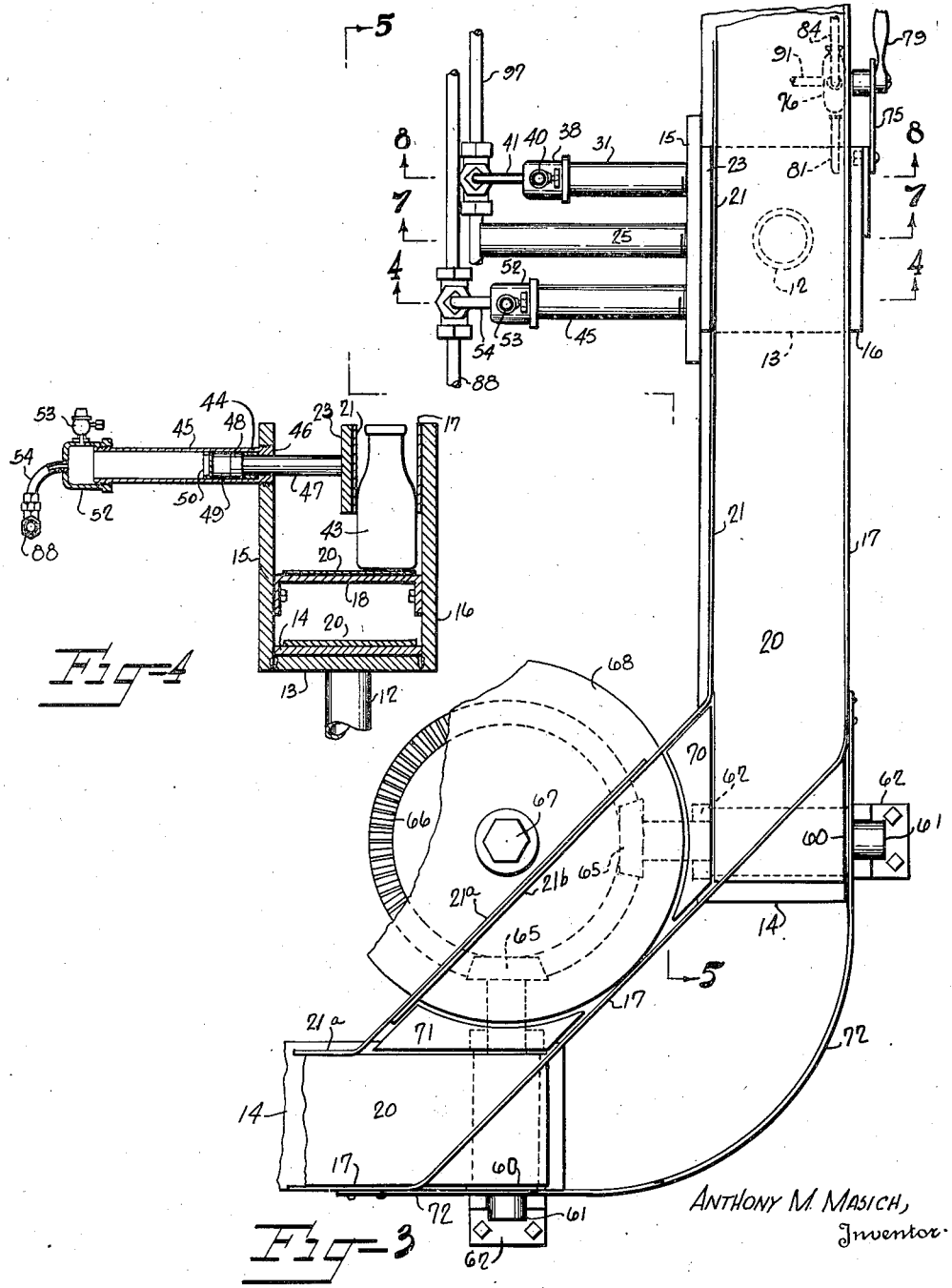

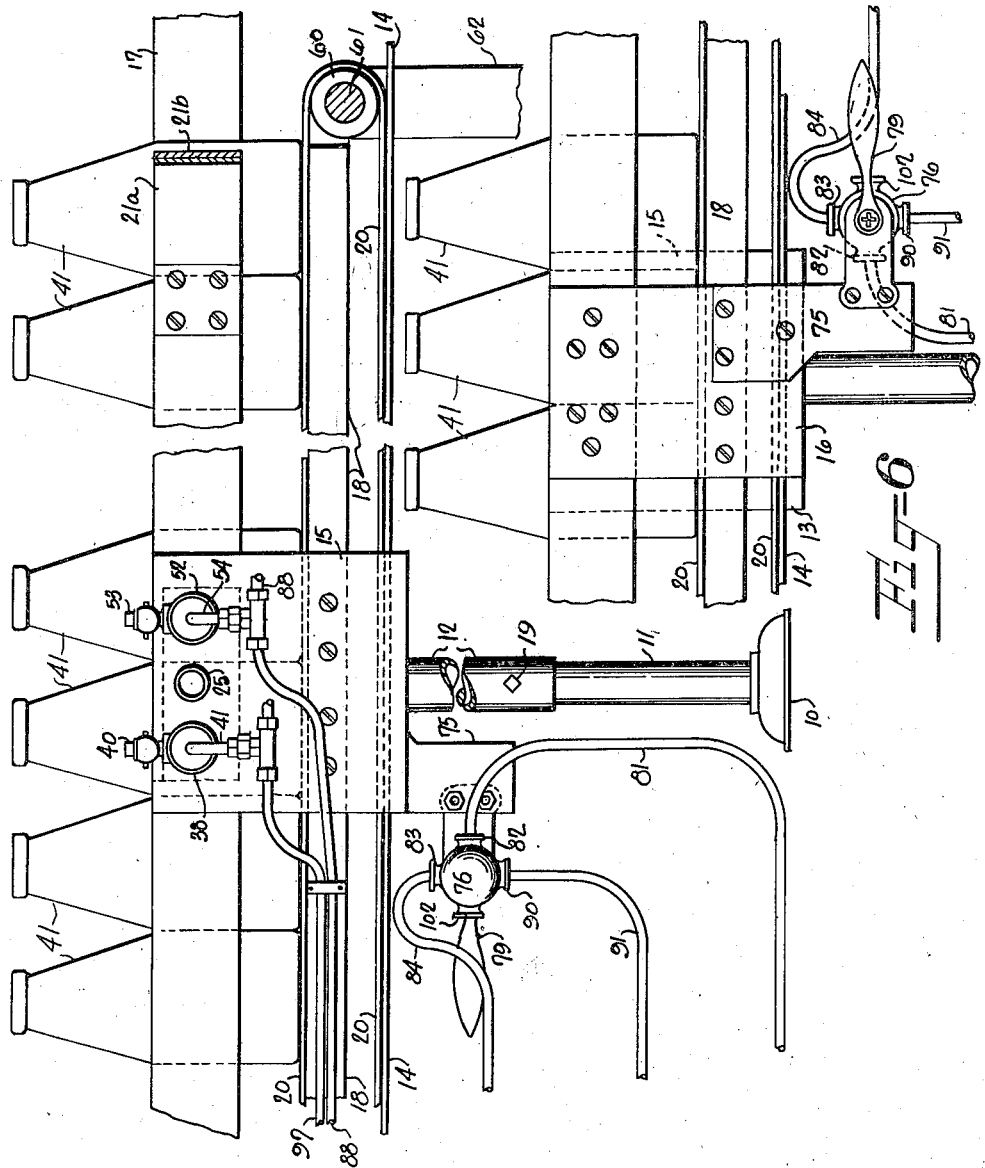

Aug. 5, 1947.   A. M. MASICH   2,425,158
ADJUSTABLE GUIDES FOR CONVEYER SYSTEMS
Filed Jan. 26, 1946   5 Sheets-Sheet 5
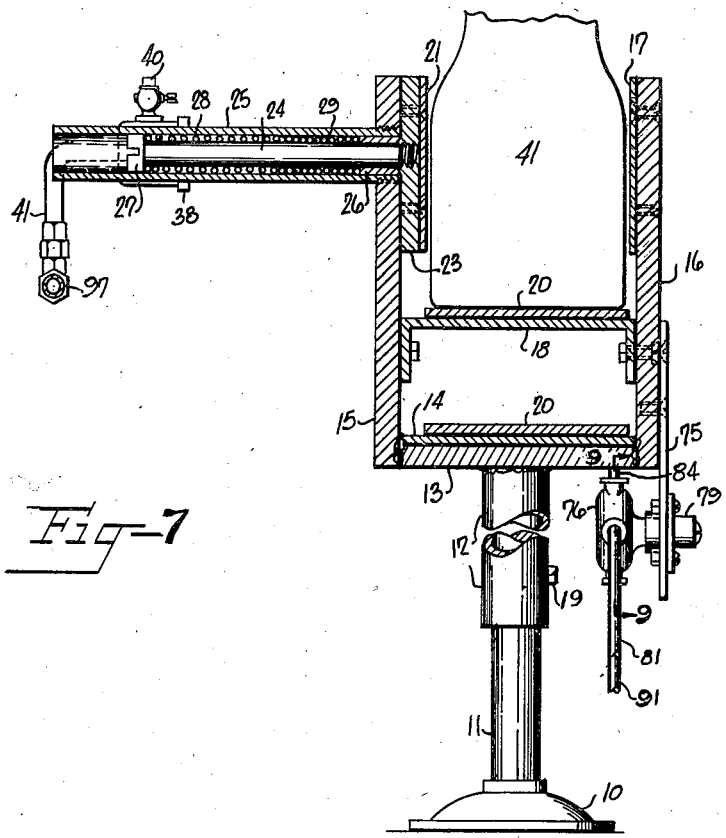
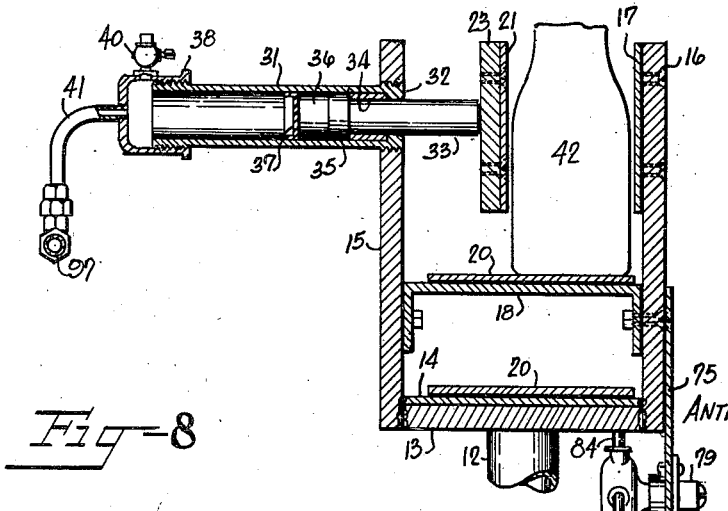
ANTHONY M MASICH, Inventor.

Patented Aug. 5, 1947

2,425,158

UNITED STATES PATENT OFFICE 2,425,158

ADJUSTABLE GUIDE FOR CONVEYER SYSTEMS

Anthony M. Masich, Winston-Salem, N. C.

Application January 26, 1946, Serial No. 643,636

6 Claims. (Cl. 198—28)

1

This invention relates to a conveyor system and, more especially, to a conveyor system in which a plurality of conveyors convey packages from one conveyor onto another conveyor, and have guide strips together with endless conveyors for conveying packages such as milk bottles, along the conveyors, there being a guide strip on each side of and above the endless conveyors for guiding the packages such as milk bottles along the conveyors, one of the guide strips being fixed and the other one being movable to provide a passageway to accommodate the width of the packages, such as the milk bottles, being conveyed.

Heretofore, some conveyors of this type have been provided with a fixed guide rail and a movable guide rail which is mechanically movable by the throwing of levers and the like; and other conveyors have been equipped with replaceable guide rails whereby one guide rail would be removed and another guide rail with suitable brackets inserted to provide the proper width of passageway between the removable guide rail and the fixed guide rail to accommodate the width of the packages, such as milk bottles, being conveyed through the conveyor system.

It is an object of this invention to provide in a plurality of conveyors for conveying milk bottles and the like, wherein there is an endless conveyor on which the bottoms of the milk bottles rest; and there is a fixed side bar or guide bar disposed adjacent one side of the endless conveyors and a movable guide bar adjacent the other side of the endless conveyor, together with means for supporting the movable guide bar for inward and outward movement relative to the fixed guide bar, together with fluid pressure means selectively operable for moving the movable guide bar a predetermined distance toward the fixed guide bar for accommodating a given size of milk bottle or other package, and said means being also selectively operable to move the movable guide bar to other predetermined points to accommodate milk bottles of other sizes.

It is another object of this invention to provide in a conveyor system comprising a plurality of endless conveyors feeding, one onto the other, a fixed guide bar and a movable guide bar, with fluid pressure means for selectively moving the movable guide bar to a predetermined position in all of the conveyors simultaneously, thereby, to accommodate different sizes of milk bottles or other packages being passed through the conveyor system.

Some of the objects of the invention having been stated, other objects will appear as the description proceeds when taken in connection with the accompanying drawings, in which:

Figure 2 is a side elevation, looking from the lower side of Figure 1 and showing a portion only of Figure 1;

Figure 3 is a top plan view on an enlarged scale of the upper right hand portion of Figure 1;

Figure 4 is a cross sectional view taken along the line 4—4 in Figure 3;

Figure 5 is a view partly in elevation and partly in section, and taken substantially along the line 5—5 in Figure 3;

Figure 6 is a reverse view of the left hand portion of Figure 5;

Figure 7 is a vertical sectional view taken substantially along the line 7—7 in Figure 3 and omitting some of the pipes;

Figure 8 is a cross sectional view taken substantially along the line 8—8 in Figure 3;

Figure 9 is a cross sectional view taken along the line 9—9 in Figure 7;

Figure 10 is a view similar to Figure 9 but showing the valve in a different setting;

Figure 11 is a view similar to Figure 9 but showing the valve in still a different setting.

Figure 1:
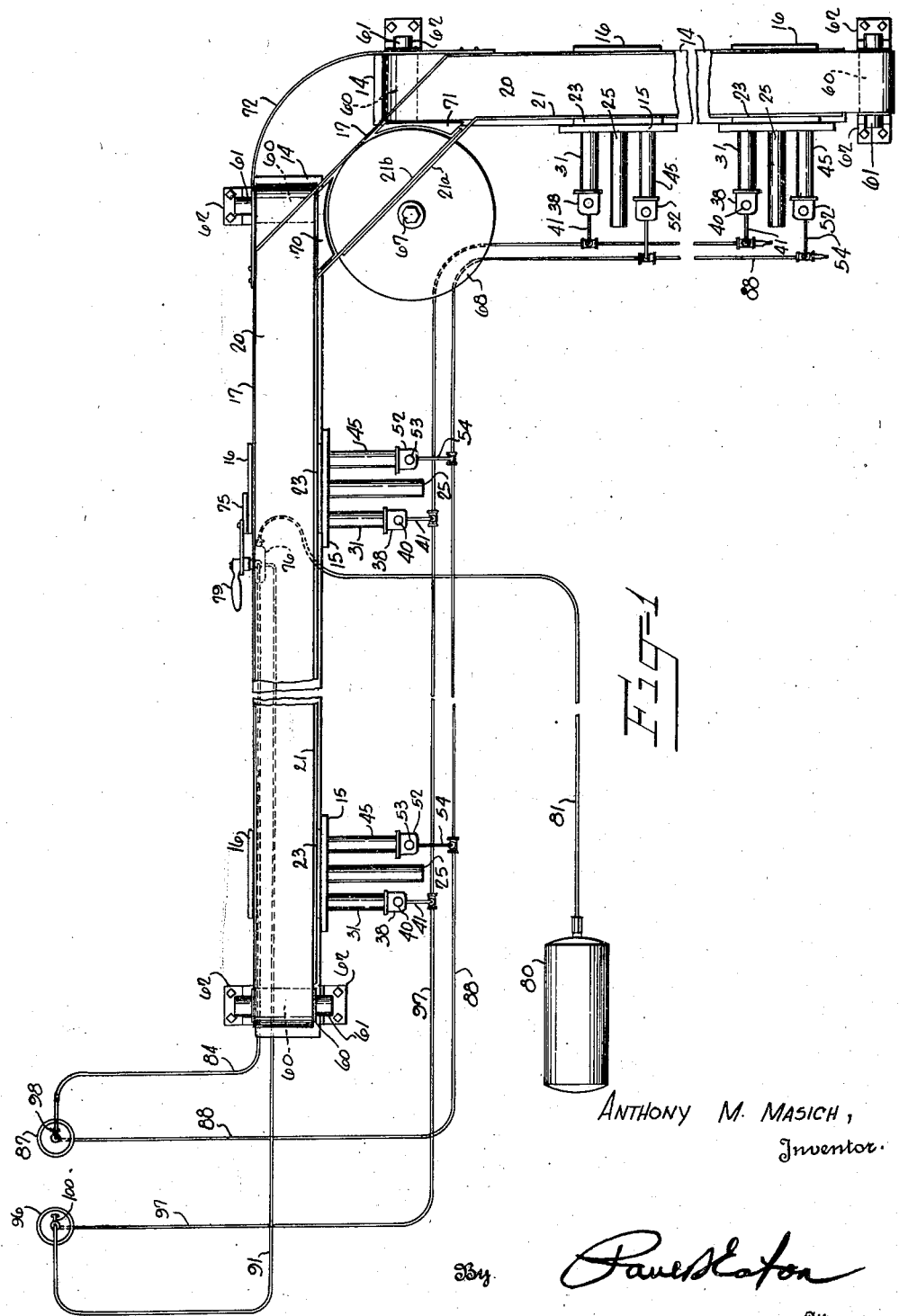
Figure 1 is a top plan view of a portion of two conveyors, and showing my control system associated therewith.

Referring more specifically to the drawings, the numeral 10 indicates a plurality of bases having uprising pipes 11 which telescopically fit into the downwardly projecting pipe 12 secured at its upper end to a plate 13, the pipes 11 and 12 being adjustable to overall height by means of a set screw 14. There a plurality of these supports comprising bases 10, pipes 11 and 12, and plates 13 arranged along the conveyor. The plates 13 support an elongated plate 19. Secured to the two outer edges of plates 13 are the uprising plates 15 and 16. Plates 16 have secured thereto a fixed guide strip 17. Secured between plates 15 and 16 is an inverted channel iron 18 for supporting the upper layer of an endless belt 20. The plate 14 supports the lower layer of this endless belt 20.

A movable guide strip 21 is secured to a plurality of plates 23, each of the plates 23 having threadably secured therein an elongated bolt 24. Threadably mounted in the plate 15 is a plurality of pipes 25 having a collar 26 fixedly secured in the end which is threadably mounted in the plate 15. This restricted portion 26 has an inside bore which provides a sliding fit for the bolt 24. The bolt 24 has an enlarged head 27 on its outer end, and between this head 27 and the restricted portion 26 there is mounted a plurality of compression springs such as 28 and 29 which normally tend to hold the parts in the position shown in Figure 7.

Also threadably secured in each of the plates 15 is a cylinder 31 having a restricted portion 32 which is threaded into the plate 15 and slidably mounted in this restricted portion 32 is a plunger 33 which has a collar 34 slidably mounted therearound, this plunger 33 having an enlarged head 35. A plug 36 is slidably mounted in the tube or cylinder 31 and fitted against the head 35. A rubber gasket or washer 37 is also slidably mounted in the cylinder 31 and fits against the plug 36. The outer end of cylinder 31 has a cap 38 threadably mounted thereon with a pet-cock 40 mounted therein for removing air from the cylinder when desired.

Also threadably penetrating the cap 38 is a pipe 41, connections to which will be presently described. Each plate 15 has also threadably mounted therein a cylinder 45 which has a restricted portion 46 in that end which is threaded into the plate 15, and in this restricted portion, a plunger 47 is slidably mounted which has an enlarged head 48 thereon, and a plug 49 is slidably mounted in cylinder 45 and fits against the head 48. There is also a rubber gasket 50 similar to the gasket 37, shown in Figure 8, which is slidably mounted in the cylinder 45 and fits against the plug 49. A collar 44 is disposed around the plunger 47 adjacent the head 48 to limit inward travel of the plunger 47. This cylinder 45 has a cap 52 threadably mounted on its open end and closing the same which is provided with a pet-cock 53 for draining air from the system as will be presently described. Connected to this cap 52 is a pipe connection 54, the pipe leading to these connections 54 to be presently described.

The endless conveyors or belts 20 which convey the articles through the various conveyors comprising this system are mounted in each end on suitable pulleys 60 mounted on shaft 61.

Some suitable means must be provided for driving the shafts 61 and, in the present instance, there is shown a suitable drive in which the shafts 61 at the proximate ends of two conveyors have beveled gears 65 thereon which mesh with a ring gear 66 disposed on a shaft 67 which is driven from any suitable driving source, not shown. This shaft 67 also drives a rotating disk 68 which transfers the packages from one conveyor to another when a change of direction is present in the conveyor system. In such instances, suitable plates 70 and 71 are provided which are level with the disk 68 and the endless belts 20. Where a bend is made, the conveyors are suitably braced or held together by a support 72, and the fixed guide 17 extends across one conveyor to the other; whereas, the movable guides 21 overlap as at 21a and 21b so that they will have relative movement when they are moved inwardly or outwardly relative to fixed guides 17.

In order to provide operating means for moving the movable guide strips 21 inwardly or outwardly with respect to the fixed guide strips 17, I can, at any convenient point on the conveyor system or anywhere in the plant where the conveyors are located, provide a control valve. In the present instance, I show a bracket 75 secured on one of the vertical plates 16, and on this bracket is suitably mounted a valve housing 76 having a core 77 fixed on a stem 78, and on the stem 78 is provided a handle 79. I provide a suitable source of compressed air, such as a tank 80 which has the compressed air supplied thereto by any suitable means such as an air compressor, not shown. Leading from this tank 80 is a pipe 81 which leads to port 82 of the valve housing 76. From port 83 of the valve housing, a pipe 84 is led to the top of a small tank 87 which is usually about half filled with a liquid such as a free-flowing oil and from tank 87 a pipe 88 is led to all of the pipes 54 connected to the cylinders 45 for setting the apparatus to fit half-pint milk bottles, for example. The pipe 88, as well as pipes 54 and cylinders 45, are filled with the oil contained in the lower half of tank 87 and still the tank 87 is usually about half filled with this oil.

Leading from port 90 of the valve housing 76 is a pipe 91 which leads to the top of a tank 96 which, like tank 87, is usually about half full of oil or other free-flowing, non-freezable substance, and from the bottom of tank 96 is led a pipe 97 which leads to all of the pipes 41 which have communication with the cylinders 31 for controlling the movable guide bar to a position to where it will accommodate pint milk bottles, for example. This tank 96 and pipes 97 and 41 are likewise filled with a liquid such as oil up to about the half-way point. Suitable valves 98, 99, 100 and 101 are provided whereby the tanks can be removed as desired without loss of fluid by closing these valves and also the rate of flow of compressed fluid into and out of tanks 87 and 96 can also be controlled by the valves 98, 99, 100 and 101. The valve housing 76 also has an exhaust port 102, and a second exhaust port 110.

The valve core 79 has two passageways 103 and 104 therethrough which are located in the same plane as the ports 82, 84, 90, 102, and 110 of the valve casing. The exit ends of these ports are identified by the reference characters A, B, C, and D. Associated with the end A of passageway 103 is a groove 105, while associated with port C of passageway 104 is another groove 106, and associated with the end or port C of passageway 104 is another groove 107.

Let us suppose that it is desired to set the conveyor system to the position to where the movable guide strip 21 would be in the position shown in Figure 7 for accommodating the largest size of package to pass through the conveyor system, such as a quart size milk bottle 41. With the valve handle 79 in the position shown in Figure 9, the compressed air within the top of tank 87 and in pipe 84 would flow through groove 106 and passageway 104, groove 107 and exhaust port 102. The compressed air in the top of tank 96 and in pipe 91 would flow through groove 105 and out of exhaust port 110. This would allow the compression springs 28 and 29 to move the plates 23 to the position shown in Figure 7.

Now, let us suppose that it is desired to set the movable guide strip 21 to a point to where it will accommodate a different size package such as one-half pint milk bottles 43. With the handle 79 in the position shown in Figure 10, compressed air will be passed from pipe 81 through passageway 103 into pipe 84 and into the top of cylinder 87 and through pipes 88 and all of pipes 54 into cylinders 45 and this will move the plungers 47 which fit loosely against the reinforcing plates 23 on the movable guide strips 21 and will force the guide strips 21 to the position shown in Figure 4 against the force of the compression springs 28 and 29 as shown in Figure 7. This compressed air entering the top of cylinder 87 will force the liquid contained in the lower half of the cylinder 87 and in the pipes 88 into the cylinders 45 as shown in Figure 4. At the same time, any compressed air in tank 96 will flow through the pipe 91 and through passageway 104 and exhaust out of the exhaust port 102. This will relieve the pressure in the cylinders 31.

Now, if it should be desired to change the conveyor system to accommodate pint packages 42, then the valve would be turned to the position shown in Fig. 11 at which time compressed air would flow into pipe 91 and to top of cylinder 96 and through pipe 97 into all of the pipes 41 and into the cylinders 31 to move the movable guide strip 21 to the position shown in Figure 8. At the same time, the air in the system serving the cylinders 45 would move out of the top of the cylinder 87 and through the pipe 84 and through passageway 103 and out of exhaust port 102 thus to relieve the air pressure in cylinders 45.

It is thus seen that there has been provided a control system for a plurality of conveyors whereby the size of the chute or passageway above an endless conveyor can be regulated in all of the conveyors simultaneously by merely the turning of the one valve controlling the entire system. This is quite an advantage in that it can be done instantly and does not require moving all over the plant and either manually changing the guide strips and inserting new guide strips with new brackets, or, by throwing a separate lever for each individual conveyor, which takes time; whereas, under the present system, all of the movable guide strips can be moved the same amount instantaneously to convert the conveyor systems from one size package to another size package.

In the drawings and specification there has been set forth a preferred embodiment of the invention, and although specific terms are employed, they are used in a generic and descriptive sense only, and not for purposes of limitation, the scope of the invention being defined in the claims.

I claim:

1. In a conveyor system having a plurality of endless conveyors and means for transferring articles being conveyed from one of the conveyors to another conveyor, each conveyor having a fixed guide strip and a movable guide strip for preventing sidewise motion of articles being conveyed, movable means for supporting all of the movable guide strips, fluid pressure means mounted for engagement with each movable guide strip, a piped connection between all of the fluid pressure means, and a valve for admitting pressure simultaneously to all of said fluid pressure means for simultaneously moving the movable guide strips in all of the conveyors to suit the width of the articles being conveyed by the conveyor.

2. In a combination, a plurality of endless conveyors disposed in angular relation to each other, means for transferring packages from one conveyor onto the proximate end of the next conveyor, said conveyors having guide strips at each side thereof for guiding the packages being conveyed by the conveyors, means for movably supporting at least the guide strips on one side of the conveyors for movement toward and away from the other guide strips, means normally holding the movable guide strips in a position to accommodate the largest size of packages being conveyed, fluid pressure operated means for moving the movable guide strips relative to the other guide strips to a position to accommodate smaller sized packages, other fluid pressure operated means for moving the movable guide strips towards the other guide strips to accommodate still smaller packages being conveyed by the conveyors, a piping system connected to all of the fluid pressure operated means and a single valve for selectively allowing fluid under pressure to move to a set of fluid pressure operated means for moving all of the movable guide strips and at the same time venting the fluid under pressure from the other fluid operated means.

3. In a combination, a plurality of endless conveyors disposed in angular relation to each other, means for transferring packages from one conveyor onto the proximate end of the next conveyor, said conveyors having guide strips at each side thereof for guiding the packages being conveyed by the conveyors, means for movably supporting at least the guide strips on one side of the conveyors for movement toward and away from the other guide strips, means normally holding the movable guide strips in a position to accommodate the largest size of packages being conveyed, fluid pressure operated means for moving the movable guide strips relative to the other guide strips to a position to accommodate smaller sized packages, other fluid pressure operated means for moving the movable guide strips towards the other guide strips to accommodate still smaller packages being conveyed by the conveyors, a piping system connected to all of the fluid pressure operated means and a single valve for selectively allowing fluid under pressure to move to a set of fluid pressure operated means for moving all of the movable guide strips and at the same time venting the fluid under pressure from the other fluid operated means, said valve also having means for simultaneously venting the fluid under pressure from all of the fluid operated means to allow the movable guide strips to move to their normal position.

4. In a conveyor system having a plurality of endless conveyors, some of the conveyors being disposed at an angle to each other and means for transferring packages from one conveyor onto the proximate end of another conveyor, guide strips on each side of the conveyors and above the level of the conveyors, for guiding packages being conveyed by the conveyors, a plurality of means associated with at least one set of the guide strips on one side of the conveyor for allowing relative movement relative to the other guide strips on the other side of the conveyor, means for holding the movable guide strips in one position, two sets of fluid pressure operated means for moving the movable guide strips relative to the other guide strips on the other side of the conveyor, a source of fluid pressure and a piping system for connecting said source to the two sets of fluid pressure operated means and a single valve settable in one position for admitting fluid under pressure to one set of the fluid pressure operated means and venting the fluid under pressure from other set of fluid pressure operated means, said valve being settable at another position to vent the fluid pressure from the first set of fluid pressure operated means and to admit fluid under pressure to the other set of fluid operated means to move their associated guide strips to still another position relative to the other guide strip.

5. In a conveyor system comprising a plurality of endless conveyors and having guide strips at each side thereof for guiding packages being conveyed by the conveyors and fluid pressure operated means associated with one of the guide strips on all of the conveyors for moving one of the guide strips relative to the other guide strips thus to change the distance between the guide strips to accommodate packages of a different size on the conveyors, a piped connection between all of the fluid pressure operated means, and a valve for simultaneously admitting fluid under pressure to all of the fluid pressure operated means.

6. An endless conveyor having a framework for supporting the same and having a fixed guide strip on one side thereof above the level of the upper portion of the endless conveyor, a movable guide strip supported along the other side of the conveyor, a plurality of shafts fixed to the movable guide strip, means on the framework for slidably supporting said shafts, tension means associated with the shafts for normally urging the movable guide trip away from the fixed guide strip, a pair of cylinders associated with each shaft and having plungers mounted therein, one end of which plungers are adapted to fit against the movable guide strip, a source of fluid under pressure, a system of pipes leading from the source of fluid under pressure to the cylinders, said system of piping having a valve therein whereby when it is set in one position will allow fluid under pressure to enter one set of said cylinders to urge their plungers against the movable guide strip to move it towards the fixed guide strip, said valve when set at another position admitting fluid under pressure to the other cylinders to move their plungers inwardly to a greater degree than the first plungers are moved, to move the movable guide strip further towards the fixed guide strip and at the same time exhausting the fluid under pressure from the first set of cylinders, said valve being settable to a third position to vent the fluid under pressure from both sets of pistons to allow the movable guide strip to move to its initial or normal position.

ANTHONY M. MASICH.

REFERENCES CITED

The following references are of record in the file of this patent:

UNITED STATES PATENTS

| Number | Name | Date |
| --- | --- | --- |
| 1,582,315 | Strandt | Apr. 27, 1926 |